Patented June 19, 1934

1,963,765

UNITED STATES PATENT OFFICE 1,963,765

FLOWED FILM

John H. Stevens, South Orange, and James F. Walsh, East Orange, N. J., assignors to Celluloid Corporation, a corporation of New Jersey No Drawing. Application April 27, 1928, Serial No. 273,424

9 Claims. (Cl. 18—57)

This invention relates to the manufacture of films and sheets from cellulose derivatives, whereby improved films are obtained at a greater rate of production and at a lower cost.

An object of this invention is to produce flowed films or sheets from solutions of cellulose derivatives. Another object of this invention is to devise a process for the production of flowed films and sheets wherein the amount of solvent required for producing the solution of the cellulose derivative is considerably lessened. Another object of this invention is to produce flowed films and sheets which shall be free from bubbles and other similar defects. Other objects and advantages will appear hereinafter in the specification and claims.

The films to which our invention relates are usually made by spreading solutions of cellulosic derivatives on the moving surface of a wheel and, after suitable exposure to evaporating influences, stripping the set and dried product in practically endless form, subject, of course, to further drying if such be found necessary. Such sheets or films have long found extensive employ in cinematograph applications and hand cameras; but our object is to extend their use to the entire commercial field, which we are enabled to do as a result of the lower production cost made possible by our invention.

The usual sheet of celluloid or other plastic made by pressing and planing costs less than a flowed sheet, and for that reason has greatly restricted the use of flowed films and sheets despite their superior qualities. Such superiority, as is well known, lies in the cleanliness and permanent surface as well as the greater strength of sheets deposited from solution. Sheets or films produced in this manner are not subject to the accidents of roll and press manipulation, neither are they subject to contamination due to factory dirt or careless handling.

One of the causes of high cost in a flowed sheet is the large proportion of solvent necessary to maintain a flowable condition. Not only is there a resultant wastage of solvent in spite of recovery methods, but the necessity of evaporating such excess solvent involves time and labor cost as well as use of expensive mechanism. Also the output (or production) of the finished film or sheet is considerably reduced.

This objection is obviated as a result of our invention, which involves the use of elevated temperatures during the process of producing or manufacturing the films, filaments or sheets. Due to the use of elevated temperature the fluidity of the mass is increased, and as a result a smaller amount or proportion of solvent (volatile solvent) may be successfully used in making up the solution from which the films, sheets, etc. are to be made.

In addition to lowering the proportion of solvent necessary to be used, our invention also expedites to a marked degree the setting and drying of the films, sheets, etc. This is due to the fact that there is less solvent to be removed and also to the fact that the solution is at elevated temperature. All these factors result in larger production per unit of time or machine than was heretofore possible.

According to our invention the "dope" or solution of cellulose derivative is heated to a temperature somewhat below the boiling point of the solvent or solvents present. The solution is maintained at this elevated temperature throughout the remaining steps of the process or at least up to the point where the solution is spread or extruded upon the film or sheet forming surface, which may be a wheel, belt, plane surface etc. In other words, this elevated temperature is maintained upon the solution during its travel throughout all parts of the storage and feed apparatus.

In order to insure a uniform product and to prevent the formation of bubbles in the film or sheet because of the elevated temperatures employed, we have found it desirable to maintain the heated (warm) solution under pressure. Such pressure should be maintained not only on the solution during process but also after the same has been deposited upon the wheel, belt, etc. This can be accomplished by maintaining the room where the film is formed under a pressure nearly equal to that imposed upon the solution in the feeding apparatus, but not high enough to interfere with adjustment to the demands of extrusion. After meeting this necessity, the room pressure should be as high as possible, due regard being given to the comfort and safety of the operators. The use of pressure on the solution has the unusual advantage of facilitating the flow of the dope or solution from the so called hopper to the belt or wheel. It also cuts down the amount of solvent required in the process to form a flowable solution.

The construction of the usual wheel apparatus, with its attendant hopper and dope supply system being well known, it is unnecessary to describe the apparatus required for the operations. A suitable adjustment or variation of the film forming system described in U. S. Patent 573,928 issued to one of us will accomplish our object. We prefer to force a band or thin stream of dope from such hopper in a way to make a direct fall upon the wheel surface and thus minimize the evaporation of solvent before deposit.

To facilitate this rapid formation of a film or sheet deposit, we find that it is desirable to so arrange the wheel, belt or other surface that there is only a short distance between it and the point at which the dope or solution emerges from the hopper. Excellent results are obtained by having the wheel or belt so close to the point of emergence, that the wheel or belt will act as a drag or pull to withdraw the dope or solution. With the belt or wheel operating at constant speed this will result in a uniform film or sheet.

In this process the well known volatile solvents such as acetone, ethyl acetate, ethyl and methyl alcohol, etc. can be wholly or partially replaced by high boilers (higher boiling solvents) for the particular cellulose derivative used. Where volatile solvents are employed, either in whole or in part, the solution can be heated to a temperature of approximately 130° F.; when high boiling solvents alone are used, the dope or solution can be maintained at a temperature of about 180° F. These figures are, of course, illustrative as the temperature which can be used will depend upon the boiling points of the particular solvents employed under the pressure conditions existing in the system.

This invention is applicable to the manufacture of flowed films or sheets from solutions or dopes of any cellulose derivative. The term "cellulose derivative" as used in the description and claims embraces within its scope cellulose esters, such as nitro cellulose, cellulose acetate, cellulose propionate as well as cellulose ethers such as ethyl cellulose, methyl cellulose, etc.

Any solvent or solvents capable of dissolving the cellulose derivative are also embraced within the scope of this invention. The term "film" as used in the description and claims is to be construed as including within its scope sheets as well as films while the term "flowing" used in the claims is to be construed as including extrusion.

Having described our invention what we claim and desire to secure by Letters Patent is:

1. In a process of making films from solutions of substitution derivatives of cellulose containing a relatively small proportion of solvent by flowing, the step of maintaining the solution above room temperature and under superatmospheric pressure.

2. In a process of making films from cellulose ester solutions containing a relatively small proportion of solvent by flowing, the step of maintaining the cellulose ester solution under superatmospheric pressure and at approximately 130° F.

3. In a process of making films from cellulose acetate solutions containing a relatively small proportion of solvent by flowing, the step of maintaining the cellulose acetate solution under superatmospheric pressure and at approximately 130° F.

4. Process of producing flowed films which comprises adding to a substitution derivative of cellulose a solvent therefor, the amount of solvent added being insufficient to form an easily flowable solution at room temperatures, heating, under superatmospheric pressure, the solution of the cellulose derivative thus formed and extruding the heated solution onto a film wheel.

5. Process of producing flowed films which comprises adding to a cellulose ester a solvent therefor, the amount of solvent added being insufficient to form an easily flowable solution at room temperature, heating, under superatmospheric pressure, the solution of the cellulose ester thus formed and extruding the heated solution onto a film wheel.

6. Process of producing flowed films which comprises adding to a cellulose acetate a solvent therefor, the amount of solvent added being insufficient to form an easily flowable solution at room temperatures, heating, under superatmospheric pressure, the solution of the cellulose acetate thus formed and extruding the heated solution onto a film wheel.

7. Process of producing flowed films which comprises adding to cellulose acetate a solvent therefor, the amount of solvent added being insufficient to form an easily flowable solution at room temperature, heating, under superatmospheric pressure, the solution of the cellulose acetate thus formed and extruding the heated solution onto a film wheel whose surface is exposed to a pressure approaching that imposed on the heated solution in process.

8. Process of producing flowed films which comprises adding to a substitution derivative of cellulose a solvent therefor, the amount of solvent added being insufficient to form an easily flowable solution at ordinary temperatures, heating the solution of the cellulose derivative thus formed to approximately 130° F. and extruding the heated solution onto a film wheel.

9. Process of producing flowed films which comprises adding to cellulose acetate a solvent therefor, the amount of solvent added being insufficient to form an easily flowable solution at room temperature, heating, under superatmospheric pressure, the solution of the cellulose acetate thus formed to approximately 130° F. and extruding the heated solution onto a film wheel whose surface is exposed to a pressure approaching that imposed on the heated solution in process.

JOHN H. STEVENS.
JAMES F. WALSH.